United States Patent [19]

Flagella

[11] Patent Number: 4,906,441
[45] Date of Patent: Mar. 6, 1990

[54] FLUIDIZED BED WITH HEATED LINERS AND A METHOD FOR ITS USE

[75] Inventor: Robert N. Flagella, Ridgefield, Wash.

[73] Assignee: Union Carbide Chemicals and Plastics Company Inc., Danbury, Conn.

[21] Appl. No.: 125,224

[22] Filed: Nov. 25, 1987

[51] Int. Cl.⁴ ............................................. F27B 15/14
[52] U.S. Cl. ............................... 422/146; 165/104.16; 219/406; 219/553; 422/199; 422/241
[58] Field of Search ............... 219/552, 553, 406, 409; 422/139, 241, 146, 199; 165/104.16

[56] References Cited

U.S. PATENT DOCUMENTS

| | | | |
|---|---|---|---|
| 3,012,861 | 12/1961 | Ling | 422/139 X |
| 3,020,129 | 2/1962 | Herrick et al. | 422/146 X |
| 3,376,109 | 4/1968 | Stedman | 422/198 X |
| 3,993,450 | 11/1976 | Schora et al. | 422/146 |
| 4,126,757 | 11/1978 | Smith, Jr. et al. | 219/406 X |
| 4,176,710 | 12/1979 | Gansauge et al. | 165/104.16 X |
| 4,213,937 | 7/1980 | Padovani et al. | 422/147 X |
| 4,249,032 | 2/1981 | Smith, Jr. et al. | 219/406 X |
| 4,298,789 | 11/1981 | Eichelberger et al. | 219/406 |
| 4,345,142 | 8/1982 | Dietze | 219/553 X |
| 4,433,233 | 2/1984 | Hierholzer, Jr. et al. | 219/553 |
| 4,443,361 | 4/1984 | Hierholzer, Jr. et al. | 219/553 X |
| 4,490,828 | 12/1984 | Fukuhara et al. | 219/553 X |
| 4,668,493 | 5/1987 | Levin | 422/241 X |
| 4,737,348 | 4/1988 | Levin | 422/199 |
| 4,749,845 | 6/1988 | Rasmussen et al. | 219/553 |
| 4,755,658 | 7/1988 | Wilsey | 219/553 X |

OTHER PUBLICATIONS

Hack's Chemical Dictionary, 4th ed.; McGraw Hill Book Company, New York, p. 579.

Primary Examiner—Robert J. Hill, Jr.
Assistant Examiner—Amalia L. Santiago
Attorney, Agent, or Firm—Morris N. Reinisch

[57] ABSTRACT

An improved fluidized bed reactor and a method for its use characterized by a variable thickness inert liner surrounding the fluidized bed reaction zone. Such liner generates heat that is transferred to the reaction zone. The heat is generated in the inert liner by passing an electrical current through the inert liner. The inert liner is thicker at the top than at the bottom and therefore more heat is generated at the bottom of the reaction zone than the top of the reaction zone due to the increased resistance of the thinner portions of the inert liner.

23 Claims, 3 Drawing Sheets

FLUIDIZED BED WITH HEATED LINERS AND A METHOD FOR ITS USE

BACKGROUND OF THE INVENTION

This invention relates to an improved heated fluidized bed reactor and a method for heating such reactors. More particularly, the present invention relates to an improved fluidized bed reactor used, in a preferred embodiment, for the production of polycrystalline silicon by the pyrolysis of silane containing gases.

A variety of means are well known in the art for applying the necessary heat to fluidized bed reaction zones contained within reactor vessels. A suitable heat transfer fluid and inductive or electrical resistance heaters are examples of direct means for supplying heat to the exterior of the reactor vessel. Such conventional means supply heat to the fluidized bed reaction zone by first passing heat through the reactor vessel wall. While adequate for the purposes of many applications, such means are not entirely satisfactory for other fluidized bed applications because of the particular nature of the desired reactions and the configurations of the reactors. There may be undesirable side effects that accompany such reactions using fluidized beds heated by such conventional means and configurations.

The production of polycrystalline silicone from silane containing gases in a fluidized bed reaction zone is a significant example of the limitation of conventional means for heating such fluidized beds. In this example, silicon particles are suspended in a fluidizing gas stream into which silane containing gas is injected. The process conditions are desirably maintained so that the decomposition of the silane occurs heterogeneously, i.e., the silane decomposes and deposits on the surface of the silicon particles in the fluidized bed. In this manner, the silicon particles enlarge by the deposit of silicon thereon so that sufficiently large particles of silicon product are grown to permit conventional removal of such particles from a collection zone beneath the reaction zone. The byproduct hydrogen and other gases can be separately removed as overhead gas from the reaction zone.

In polycrystalline silicon fluidized bed applications, liners have been employed on the interior of the reactor vessel walls to provide a material having the same coefficient of expansion as the silicon as well as to provide a barrier which would prevent the silicon particles from becoming contaminated by contacting the heated metal walls of the reactor vessel wall. The liners also serve to prevent silicon from becoming deposited onto the reactor vessel walls.

In the case of the pyrolysis of silane containing gas to silicon in a fluidized bed reaction zone, conventional means of heating a fluidized bed reaction zone typically employ a heat source which supplies heat uniformly to the external reaction vessel walls. The pyrolysis of silane containing gas may be achieved by capacitive heating of the fluidized bed reaction zone, as discussed in U.S. Pat. No. 4,292,344 to McHale. Other methods of heating such as uniform induction coils, electrical resistance elements and indirect gas fired heaters have also been utilized on the exterior of the reactor vessel walls and are disclosed in U.S. Pat. Nos. 3,012,861 to Ling and 3,012,862 to Bertrand, et al. These conventional means are capable of supplying the necessary heat to the external vessel walls. In certain applications, the use of uniform heating on the external walls of the reactor vessel requires the heat to pass through the vessel wall and liner resulting in a degree of conductive heat loss. Also, the use of conventional heating means often results in a temperature gradient from the bottom of the reactor to the top, i.e., a lower temperature at the bottom and a higher temperature at the top due to the lower temperature of a gas distributor and production collection chamber located below the reaction zone. When the temperature gradient is present, the lower portion of the fluidized bed is not being effectively utilized and the full benefit of the fluidized bed reaction zone is not realized.

Therefore, the need exists for the development of an improved heated fluidized bed reactor wherein it is possible to introduce more heat near the bottom than the top of the fluidized bed reactor so that full utilizaion can be made of the fluidized bed reaction zone. It is particularly desirable that such heating means be capable of supplying heat to the reaction zone without requiring the heat to pass through the reactor vessel wall.

SUMMARY OF THE INVENTION

The present invention relates to an improved heated fluidized bed reactor comprising a means defining a fluidized bed reaction zone capable of confining fluidized bed particles. The fluidized bed reactor further comprises a liner being inert and surrounding the reaction zone, the liner being composed of an electrically conductive material that rises in temperature as an electric current is passed therethrough. A means for supplying an electrical current is attached to the inert liner thereby causing the inert liner to generate heat which is transferred to the reaction zones.

In one embodiment, the inert liner is thicker at its top than at its bottom. This varying degree of thickness allows the amount of heat generated by the inert liner to be greater at the bottom of the liner than the heat generated at the top of the liner.

The present invention also relates to a method of heating a fluidized bed reaction zone by surrounding the reaction zone with an inert liner, the inert liner composed of an electrically conductive material that rises in temperature as an electrical current is passed therethrough. The electrical current is supplied to the inert liner thereby causing the inert liner to generate heat that is transferred to the reaction zone.

Finally, the present invention relates to a method for the production of high purity polycrystalline silicon by pyrolizing silane containing gas in a fluidized bed reaction zone. The silane containing gas is heterogeneously decomposed in a fluidized bed of silicon particles, the fluidized bed of silicon particles being surrounded by an inert liner composed of an electrically conductive material that rises in temperature as an electric current is passed therethrough. The electric current is supplied to the inert liner thereby causing the inert liner to generate heat that is transferred to the reaction zone.

In accordance with the present invention, an improved heated fluidized bed reactor utilizing a variable thickness inert liner as a heating source is provided. The use of liners as the heat source bypasses the vessel wall as a medium through which the heat must travel. The use of the variable thickness inert liner as a heat source also allows for the introduction of more heat near the bottom of the reactor where it is needed, thus allowing for a more efficient use of the whole fluidized bed. The improved heated fluidized bed reactor and the method of heating the reactor do not suffer from the drawbacks associated with conventional external heating means.

Additional objects, modifications, and advantages of the present invention will be readily apparent from the following description of the present invention, when taken in view of the following drawings. The drawings are intended as illustrations of certain preferred embodiments of the present invention, and are not intended to be limitative in any way of the scope of the disclosure.

DETAILED DESCRIPTION OF THE INVENTION

The present invention is described herein with regards to a preferred embodiment relating to the pyrolysis of silane containing gases to silicon. It is understood that the present invention is equally applicable to other types of reactions capable of being performed in a fluidized bed requiring the input of heat.

As used herein "heterogeneous decomposition" refers to the reduction of silane containing gas to silicon which occurs in two or more phases such as when the decomposition occurs at a boundary between a gas and a solid phase. This heterogeneous decomposition results in the deposition of silicon on either suspended silicon seed particles in the fluidized bed or on the internal surfaces of the fluidized bed reactor. "Homogeneous decomposition" occurs in a single phase, such as the gas phase and produces high surface area silicon powder or dust in the micron to submicron size range. Generally, at a given temperature, the decomposition of silane containing gas will be either heterogeneous and/or homogeneous, depending on the concentration of the silane containing gas. Generally, a low silane containing gas feed concentration is desirable to maintain the decomposition of silane containing gas to silicon in a heterogeneous mode. However, a very low feed concentration of silane containing gas and/or halosilane may not provide a high production rate of silicon.

By the phrase "silicon seed particle" is meant those particles of the fluidized bed which range in size from about 50 microns to about 400 microns. Such particles desirably enlarge as silicon is deposited thereon, to be eventually collected as silicon product particles. "Silicon product particles" are those seed particles which have enlarged to a size of at least about 400 microns, preferably ranging from about 400 microns to about 1300 microns. Such particles segregate near the bottom of the reaction zone and are collected in a collection zone, allowing for removal by conventional means. The term "silicon particles" refers to both the silicon seed particles and the silicon product particles of the fluidized bed.

The phrase "silicon powder" refers to generally micron to submicron, high surface area silicon particles resulting from the homogeneous decomposition of the silane containing gas.

As used herein, the phrase "silane containing gas" refers to both silane and/or halosilane containing gases unless otherwise indicated.

The term "fluidizing gas" or "fluidization gas" as used herein refers to the combination of silane containing gas and any other additional inert carrier gas which is added to the fluidized bed reactor to aid in the fluidization of the silicon particles.

Polycrystalline silicon may be prepared by introducing a flow of silane containing gas into a fluidized bed of fine silicon particles suspended in a reaction zone. These silicon particles are suspended by an upward flow of a fluidizing gas in the reaction zone. The temperature in the reaction zone is maintained with the decomposition temperature range of the silane containing gas and the melting point temperature of silicon. The silane containing gas is decomposed to form silicon which deposits on the surface of the silicon particles. As the silicon is deposited on the silicon particles, such particles enlarge and become segregated near the bottom of the fluidized bed in a collection zone disposed beneath the reaction zone. Such silicon product particles are recovered by conventional means from the collection zone. The fluidizing gas velocity through the reaction zone is maintained above the minimum fluidization velocity of the silicon particles.

The silane containing gas may be introduced into the fluidized bed reaction zone from the bottom thereof in accordance with conventional practices. The gas may be introduced without dilution or the gas may be diluted with an inert carrier or fluidization gas such as hydrogen, argon, helium, or the like. In the decomposition of silane, byproduct hydrogen is produced and can be recycled for use as a carrier gas for additional quantities of silane feed gas in the semicontinuous or continuous operations of a fluidized bed.

Any suitable silane containing gas stream capable of being thermally pyrolyzed or reduced in the gas phase to silicon may be used as a feed gas to the fluidized bed. Illustrative of such gases are silane and the halosilanes of chlorine, bromine, fluorine, and iodine. While the chlorosilanes, such as trichlorosilane, tetrachlorosilane, and dichlorosilane may be employed, particular advantages are realized through the use of silane. The slightly exothermic silane pyrolysis reaction goes substantially to completion, is irreversible, and is initiated at a somewhat lower temperature of about 200° C. when compared to the pyrolysis conditions required for halosilane containing gases and the like. In addition, the silane and its decomposition products, i.e., silicon and hydrogen, are noncorrosive and nonpolluting. The byproduct hydrogen gas generated may be used as a recycle inert carrier gas within the system. In comparison, the chlorosilane decomposition is a reversible and incomplete reaction which results in the production of by-products which are corrosive in nature. Accordingly, silane is a preferred gas for the use in the present invention, although other silane-containing gases may be utilized.

The silane feed gas streams and the inert carrier gas streams may be introduced into the reaction zone by employing a conventional gas distributor below the reaction zone. This is also where the particles to be fluidized may be optionally introduced into the fluidizing gas. The fluidization gas velocity through the reaction zone is generally maintained at a velocity of about two to six times the minimum fluidization velocity necessary to fluidize the particles of average diameter within the fluidized bed. As used herein, the term "average diameter" means the one over the summation of the quotients of a given particle weight fraction and the respective diameters attributed to the particular fraction of particles. Preferably, the fluidization gas velocity is about four times the minimum fluidization velocity for the particles in the fluidized bed. The minimum fluidization velocity may be determined by conventional means known in the art, such as the equation:

$$\frac{1.75 D_p^2 \rho^2}{\Phi_S \epsilon^3 \mu^2} \overline{V}_o^2 + \frac{150 D_p \rho (1-\epsilon)}{\Phi_S^2 \epsilon^3 \mu} \overline{V}_o - \frac{D_p^3 g \rho (\rho_p - \rho)}{\mu^2} = 0$$

wherein $\overline{V}_o$ = minimum superficial gas velocity for fluidization (ft/s);
$D_p$ = average diameter of particles in the bed (ft);
$\rho$ = density of fluidization gas (lb/ft$^3$);
$\rho_p$ = density of particles (lb/ft$^3$);
$\phi_s$ = sphericity of particles;
$\epsilon$ = void fraction in a bed of particles at minimum fluidization;
$\mu$ = absolute viscosity of fluidizing gas (lb/ft-s);
g = gravitational acceleration (ft/s$^2$).

The minimum fluidization velocity is a strong function of gas viscosity and gas density, as well as average particle diameter, particle shape, and void fraction. Thus, the minimum fluidization velocity varies over a wide range with small change in the above factors. It is not intended that the present invention be limited to any particular minimum fluidization velocity of fluidization gas velocity.

As discussed, the temperature in the reaction zone is maintained within the decomposition range of the silane containing gas and the melting point temperature of silicon. The temperature at which the decomposition of silane containing gases occur ranges from about 200° C. and above. The melting point temperature of silicon is about 1400° C. Therefore, it is preferred to operate the reaction zone at a temperature ranging from about 200° C. to about 1400° C., preferably from about 550° C. to about 1000° C.

The production of polycrystalline silicon by the fluidized bed reactor method described depends on supplying seed particles of silicon with an average diameter ranging from about 50 microns to about 400 microns. These silicon seed particles form the substrates upon which the silicon derived from the heterogeneous decomposition of the silane is deposited. As the silane is decomposed and the seed particles grow in size, the enlarged product particles with an average diameter of at least about 400 microns, preferably about 400 microns to about 1300 microns segregate near the bottom of the reaction zone into a collection zone. The larger silicon product particles are then collected and may be either continuously or periodically removed from the reactor. Such large particles are of sufficient size to be easily handled without any undue contamination of the high purity material. It is to be understood that the size of the silicon particles comprising the fluidizied bed are not critical to the invention per se and may be maintained within the normal limits commonly employed in the various fluidized bed applications known in the art.

In order to supply replenishing silicon particles for the fluidized bed, it is possible to divert a small fraction of the product material and suitably crush or grind this material into small, fine seed-sized particles. Such particles may be reintroduced into the fluidized bed. Upon introduction, such small silicon particles become growth sites for silane decomposition as before and will gradually increase in size and be withdrawn from the bed.

The fluidized bed reactor in accordance with this invention is generally a vertical vessel wherein the desired fluidized bed reaction is carried out. Examples of such reactions include ion exchange reactions, absorption reactions, catalytic reactions, and the like. A preferred reaction is the pyrolysis of silane containing gas to silicon which deposits on silicon seed particles in a fluidized bed reaction zone. While a cylindrical vessel and reaction zone are preferred, it is to be understood that any configurations which are acceptable to fluidized bed operations may be utilized. The dimensions of the particular vessel and the reaction zone are not deemed critical to the practice of the present invention. The particular dimensions will be primarily dependent upon the economics of design. The reaction zone must not be too narrow or this leads to low output; however, it must not be too large or this leads to high energy costs associated with the high temperatures and fluidization gas velocities. In the preferred embodiment, wherein silane containing gas is pyrolyzed to silicon, the diameter of the fluidized bed reaction zone may range from about 6 inches to about 48 inches, preferably from about 12 inches to about 24 inches and most preferably about 12 inches.

In the production of polycrystalline silicon, direct contact of the high surface area silicon seed particles and/or silicon product particles with the vessel wall may result in a chemical or physical contamination of the silicon. In order to prevent this contamination, it is known to place a liner between the reaction zone and the wall of the reaction vessel. In addition to choosing the inert liner from a material that may be used in a manner which will not adversely affect either chemically or physically the silicon seed or product particles, Applicant has found it advantageous to choose an inert linear that, due to the liner's electrical resistance, will generate heat when an electrical current is passed through the liner. In the pyrolysis of silane containing gases it is preferred to use an inert liner that is capable of having high purity silicon deposited thereon. This prevents contamination of the silicon particles by the inert liner.

The particular advantage is derived from supplying an electrical current directly to the inert liner, thus causing the liner to generate heat which may be transferred to the reaction zone. The coated liner also serves to prevent the contamination of the silicon particles and prevents the deposition of silicon onto the reactor vessel wall. When the inert liner is used as the heat source, any heat losses to the ambient surroundings are reduced due to the heat source being within the reactor vessel as opposed to the heat source being outside the reactor vessel. Also, there is no heat loss due to heat transfer from the heat source through the reactor vessel walls and into the reaction zone since the heat source is now inside of the reactor vessel wall.

Examples of such inert materials include graphite, stainless steel, molybdenum, and the like. The particular liner material will depend on the particular type of reaction occurring in the fluidizing bed reactor. The liner should be chosen so it does not adversely affect the reaction. Preferably, a graphite liner is used in the practice of the present invention when using the fluidized bed reaction zone to pyrolyze silane containing gas to silicon.

When a graphite liner is used during the pyrolysis of the silane it is possible that an amount of high purity silicon may become deposited onto the graphite liner. The heat from the heat source, (i.e., inert liners) must then pass through this additional layer of thermally resistant material, which may result in a less efficient transfer of heat from this inert liner to the reaction zone when compared to the heat transfer from the inert liner without a layer of silicon deposited thereon. However, it is possible that the silicon layer may also serve as a heat source as a result of an electrical current which is supplied to the silicon layer. Since the silicon layer and graphite liner are intimately contacted, the electrical current may be supplied to the silicon layer by supplying a current to the graphite liner. Also, the silicon layer serves to protect the silicon particles from contamination caused by the silicon particles contacting the inert liners.

It is also believed that silicon and the graphite liner may react to form a silicon carbide layer on the exposed surfaces of the graphite liner. The silicon carbide forms a refractory type layer which is resistant to very high temperatures. Silicon carbide is also a very hard substance which reduces the possibility of high levels of contamination of the silicon particles. Although not fully understood, it is possible that the silicon carbide layer may serve as a heat source as a result of an electrical current which is supplied to the silicon carbide layer. Since the silicon carbide layer and the graphite liner are intimately contacted, the electrical current may be supplied to the silicon carbide layer by supplying an electrical current to the graphite liner.

It is also possible that a layer of silicon may become deposited on top of the layer of silicon carbide in much the same manner as the silicon may deposit onto the graphite liner. Again, although not fully understood it is believed that the silicon layer could serve as a heat source by passing an electrical current therethrough. The intimate contact of the silicon, silicon carbide and graphite liner allows for an electrical current to be supplied to the silicon layer by supplying an electrical current directly to the graphite liner.

Below the lined reaction zone used in the pyrolysis of silane containing gas to silicon, the reactor employs a conventional gas distributor for the introduction of the feed and other possible inert carrier gas streams. This is also the location wherein silicon seed particles to be fluidized may be optionally introduced into the fluidizing gas. In this gas distribution zone, the vessel walls are cooled to a temperature of about 200° C., by cooling water, nitrogen or the like. Such temperatures are maintained to prevent the premature decomposition of the silane containing gases to silicon which would deposit onto the distributor apparatus. Because of the lower temperature of the gas distribution zone, there is a tendency for such zone to act as a heat sink causing a loss of heat from the reaction zone which is maintained at an elevated temperature. Such loss of heat from the reaction zone results in the temperature of the lower reaction zone being lower than the temperature of the upper portions of the reaction zone. This may result in an underutilization of the whole fluidized bed reaction zone. In the case of the pyrolysis silane to silicon, the lower temperatures in the reaction zone may result in a less than efficient conversion of silane containing gas to silicon. In order to desirably maintain the temperature of the lower part of the reaction zone at the same temperature as the upper part of the reaction zone, applicants have recognized that it is necessary to introduce more heat into the lower portions, compared to the upper portions of the reaction zone.

The inert liners which are positioned within the reaction zone are preferably of varying thickness. That is, it is preferred that the thickness of the inert liner to be greater at the top of the reaction zone than at the bottom of the reaction zone. The thickness of the inert liner at the top of the reaction zone may range from about 2 inches to about 12 inches, preferably from about 4 inches to about 6 inches. At the bottom, the thickness may range from about ⅛ inch to about 4 inches, with a thickness of about ½ inch to about 1 inch being preferred. The relative ratios of the thickness of the inert liners at the top and the bottom is not deemed critical to the present invention and, therefore, any combination of the given thicknesses may be utilized. Further, it is possible that the variation of the thickness of the liner from top to bottom be any of a number of configurations such as stepwise, slanted stepwise or a smooth gradient. The configuration is not deemed critical to the invention so long as the liner increases in thickness from bottom to top.

This varying thickness allows for the introduction of more heat into the bottom of the reaction zone due to the liner being narrower near the bottom. As the cross-sectional area of the liner decreases, the electrical resistance increases. As the resistance of the liner increases the amount of heat generated by the electric current flowing in the liner also increases. The upper part of the inert liner being thicker (i.e., larger cross-sectional areas) would result in less heat being generated and introduced to the top of the reaction zone. Therefore, by the practice of the present invention, it is possible to introduce more heat at the bottom of the reaction zone than at the top of the reaction zone. As noted previously, this additional heat is required due to the heat loss caused by the lower temperature gas distribution zone located directly beneath the lower portion of the reaction zone.

In the practice of the present invention, it is the inert liners which function as the heat source for the reaction zone. Heat for the reaction zone is generated by supplying a current to the inert liner causing the inert liner to generate heat that is transferred to the reaction zone. The supply of current to the inert liner may be achieved by any conventional current generating means known in the art. Typical of such means would include the application of a voltage across the inert liner. The amount of current necessary to provide the desired amount of heat to the fluidized bed reactor will be primarily dependent upon the amount of heat desired, the thickness and height of the particular portions of the inert liner, and the resistivity of the inert liner. These factors may all be related by conventional relationships between current, resistance, surface area and power. The particular design must be chosen so that adequate heat is provided to carry out the reaction within the fluidized bed reaction zone. In the application of silane pyrolysis, for example, the current may range from about 7000 to about 15,000 amps.

When using the inert liners of varying thickness for the pyrolysis of silane, in accordance with the present invention, it is possible to maintain the upper portion of the inert liner at a temperature ranging from about 500° C. to about 1400° C. and the lower portion at a temperature ranging from about 500° C. to about 1400° C. Preferably, the upper portion is at a temperature ranging from 550° C. to about 1000° C. and the lower portion at a temperature ranging from about 550° C. to about 1000° C.

Therefore, the present invention provides a fluidized bed reactor wherein the heat is supplied to the reaction zone by an inert liner surrounding the reaction zone. Preferably, the inert liners are of varying thickness and therefore are capable of supplying more heat to the bottom of the reaction zone than to the top. The heat is generated in the inert liners by supplying an electrical current to the inert liners. The use of such heating source results in a more uniform temperature throughout the reaction zone and thus a more efficient use of the whole reaction zone.

The present invention will become more apparent from the following description thereof when considered together with the accompanying drawings. Such drawings are set forth as being merely illustrative of the invention and not intended in any way to be limitative thereof.

Figure 1:
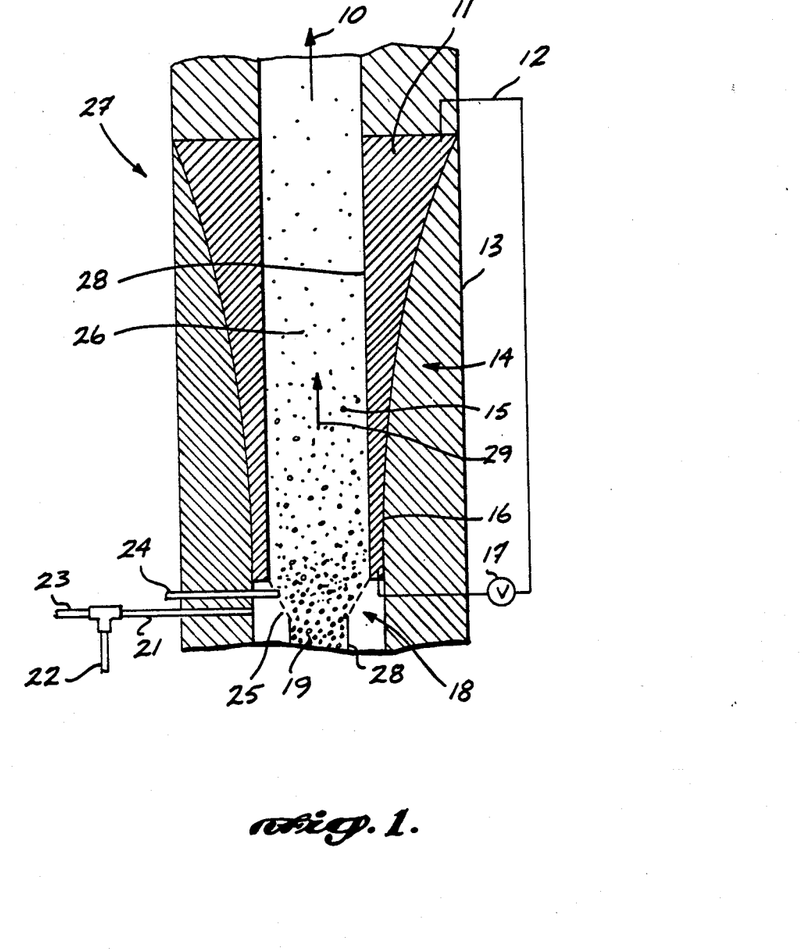
FIG. 1 illustrates a schematic cross-sectional view of the lined fluidized bed reactor in accordance with the present invention.

FIG. 1 represents a schematic illustration of a silane fluidized bed reactor 27, which pyrolyzes silane feed material in line 23 entering the bottom of reacto4 27 through line 21. The silane feed may be combined with the inert carrier gas in line 22 prior to entering the reactor 27 through line 21 and passing upwardly through the reaction zone in the direction of arrow 29. The silane is thermally decomposed in the fluidized bed 26 to produce by-product hydrogen gas which exits the reactor 27 at outlet 10 and silicon product particles 19 which are recovered in the collection chamber 28. The pyrolysis reaction occurs in the fluidized bed 26 in which are suspended silicon particles 15. As the silane decomposes, it deposits on the silicon particles 15 causing them to enlarge to silicon product particles 19. The silicon product particles 19, segregate near the bottom of the reactor 27 in the collection chamber 28 and are removed from such collection chamber 28 by conventional means not shown.

Feed gases in line 21 enter the fluidized bed reaction zone 26 through a conventional gas distributor 18 containing perforations 25. The gas distributor 18 is typically maintained at a lower temperature than the reaction zone 26 to prevent the premature thermal decomposition of the silane containing gases to silicon.

Since the silicon particles 15 are grown to silicon product particles 19 which are removed from the reactor 27, it is required that new silicon seed particles be introduced to the fluidized bed through line 24. The silicon seed particles entering through conduit 24 may be prepared by grinding or milling the silicon product particles 19 which have been collected.

The flow of the inert carrier gas and silane feed gas 29 in the collection chamber 28 is controlled such that it will upwardly transport relatively small silicon particles 15, but will not interfere with the segregation of the enlarged silicon product particles 19 in the collection chamber 28. The hydrogen by product gas and any fluidizing gases exit the fluidized bed reaction zone 26 through outlet 10.

The heated fluidized bed reaction zone 26 is lined with graphite liners 14 inside of the reactor vessel wall 13. The graphite liners 14 are of varying thickness. The top region 11 of the graphite liner is thickner than the bottom region 16 of the graphite liner. This varying thickness allows for the application of more heat to the bottom of the reaction zone 26 than at the top of the reaction zone. More heat is generated in the thinner portions of the graphite liner 14 due to the increase in resistance of the liner 14 as the cross-sectional area decreases. The heat is supplied to the fluidized bed reaction zone 26 by supplying an electrical current to the variable thickness graphite liner 14 through electrical connection 12. The electrical current supplied to the graphite liner 14 generates heat which is transferred to the reaction zone 26 through the graphite liner wall 28. The current in the graphite liner 14 is supplied by applying a voltage 17 directly to the graphite liner. Heat loss to the ambient surroundings is controlled by insulation and the vessel wall 13.

A larger amount of heat is desirably introduced to the lower portion of the reaction zone 26 due to the heat loss created by the gas distributor 18 which is maintained at a lower temperature than the reaction zone 26. The gas distributor 18 is maintained at a lower temperature in order to prevent the premature thermal decomposition of the silane containing feed gas entering through line 21.

Figure 2:
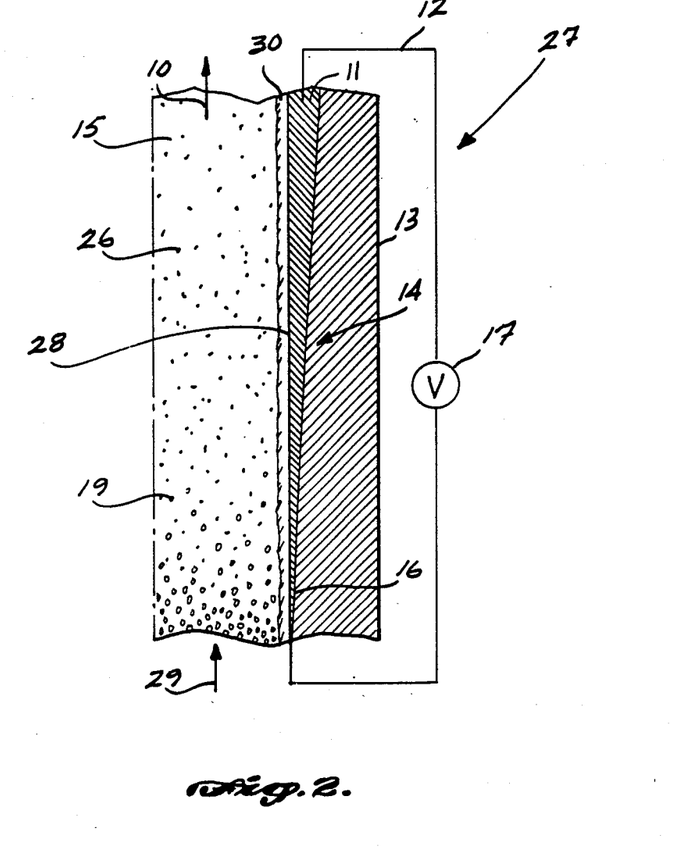
FIG. 2 illustrates an enlarged cross-sectional view of the fluidized bed reactor wall with silicon deposited on the inert liner in accordance with one embodiment of the present invention.

FIG. 2 illustrates an enlarged cross-sectional view of the fluidized bed reactor 27 described with reference to FIG. 1. The silane feed gas flowing in the direction of arrow 29 has been pyrolyzed and deposited on both the silicon particles 15 and the exposed wall 28 of the graphite liner 14. This layer of silicon 30 may comprise both silicon and/or a silicon carbide. It is believed that as silicon deposits onto the graphite liner 14, a chemical reaction may occur between the graphite and silicon to form a layer of silicon carbide 30. It is also possible that a layer of silicon may become deposited onto the formed layer 30 of silicon carbide. In this particular embodiment, an electrical voltage 17 is applied directly to the graphite liner 14. The graphite liner 14 at the upper portion 11 is thicker than the graphite liner 14 at the lower portion 16. This allows for a greater amount of heat to be generated at the lower portion 16 of the graphite liner 14. In this particular embodiment, an electric current is also supplied to the silicon/silicon carbide layer 30 due to the intimate contact of the silicon/silicon carbide layer with the graphite liner 14 and direct application of the voltage 17 to the graphite liner 14. The heat that is generated by the graphite liner 14 and the silicon/silicon carbide layer 30 is transferred to the reaction zone 26.

Figure 3:
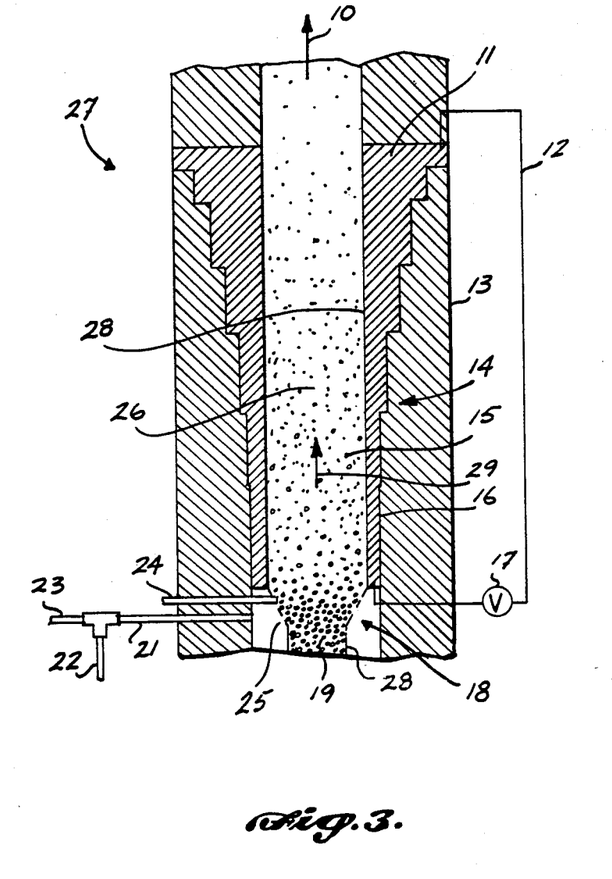
FIG. 3 illustrates a schematic cross-sectional view of the lined fluidized bed reactor in accordance with the present invention.

FIG. 3 illustrates the same fluidized bed reactor of FIG. 1, however the graphite liner 14 is of a different configuration. As can be seen, the graphite liner 14 of FIG. 3 increases in thickness from its bottom region 16 to its top region 11 in a stepwise configuration rather than a smooth gradient as depicted in FIG. 1.

The following example is intended to illustrate a particular embodiment of the present invention and is not intended to limit the scope of the disclosure in any way.

EXAMPLE I

The reactor and process of this invention as depicted in the preceding Figures and Detailed Description is used to thermally decompose silane containing gas to silicon.

The fluidized bed reaction zone has a bed height of 152.4 centimeters and a bed diameter of 30.5 centimeters. The fluidized bed reaction zone is surrounded by a graphite liner that increases in thickness from the bottom to the top of the liner. The liner has three sections of differing thickness. The bottom portion of the graphite liner is 30.48 centimeters high and has a thickness of 0.65 centimeters. The middle portion of the graphite liner has a height of 60.96 centimeters and has a thickness of 0.96 centimeters. The upper portion of the graphite liner has a height of 60.96 centimeters and a thickness of 1.275 centimeters. The graphite liner is contained within a reactor vessel. An electrical current of 7,796 amps is supplied to the graphite liner by a current generating source. The current passes through the top, middle and lower portions of the graphite liner. The resistivity of the graphite liner is 950 microhm-cm at room temperature and the cross-sectional surface area of the lower portion of the graphite liner is 63.59 $cm^2$, the middle portion of the graphite liner is 94.84 $cm^2$, and the upper portion of the graphite liner is 127.22 $cm^2$.

The amount of heat generated by each portion of the graphite liner is calculated given the amount of current flowing through the particular portion of the graphite liner and the resistance of each portion of the graphite liner. The lower portion of the graphite liner generates 30 kilowatts of heat, the middle portion of the graphite liner generates 40 kilowatts of heat and the upper portion of the graphite liner generates 30 kilowatts of heat. The amount of heat generated by the graphite liner increases from the bottom of the liner to the top of the liner for a given symmetrical portion of the graphite liner. The bottom portion of the graphite liner is half the height of the upper and middle portions of the graphite liner, therefore the relative heat generated by similarly sized portions of the upper and middle portions of the liner would be half that generated by the total middle and upper portions, i.e., 20 kilowatts for the middle portion and 15 kilowatts for the upper portion. Thus, for given symmetrical portions of the graphite liner of equivalent height, the relative heat generated is 30 kilowatts in the bottom portion, 20 kilowatts in the middle portion, and 15 kilowatts for the top portion of the graphite liner.

This example illustrates that as the thickness of the graphite liner increases, the amount of heat generated byy the graphite liner decreases. The use of the graphite liner as the heat source serves several purposes. First, because the graphite liner is in direct contact with the fluidized bed, there are no heat transfer losses associated with the heat transfer through the reactor vessel walls. Second, the graphite liner does not have a deleterious effect upon the reaction occuring within the fluidized bed because it is relatively inert in relation to the silane pyrolysis reaction. Finally, the use of the graphite liners of varying thickness allows for more introduction of heat near the bottom of the fluidized bed compared to the amount of heat introduced at the top of the fluidized bed.

It is to be understood that modifications and changes to the preferred embodiment herein described and shown can be made without departing from the spirit and scope of the invention.

What is claimed is:

1. A heated bed reactor comprising:
   (a) means defining a fluidized bed reaction zone capable of confining fluidized bed particles;
   (b) a liner surrounding the reaction zone and being in contact with the contents of the reaction zone and inert such that it at least does not adversely affect the reaction, the liner being composed of an electrically conductive material that rises in temperature as an electric current is passed therethrough;
   (c) means connected to said insert liner for supplying an electrical current to the inert liner thereby causing the inert liner to generate heat that is transferred to reaction zone; and
   (d) a fluidizing means for providing fluidization in the reaction zone.

2. The heated fluidized bed reactor of claim 1, wherein the inert liner has a top portion and a bottom portion and is thicker at its top portion that at its bottom portion.

3. The heated fluidized bed reactor of claim 2, wherein the amount of heat that is capable of being generated byy the inert liner is greater at the bottom of the liner than the heat that is capable of being generated at the top of the liner.

4. The heated fluidized bed reactor of claim 2, wherein the inert liner is capable of forming a silicon coating thereon, said coating being electrically conductive and also passing current therethrough received from the inert liner, thereby generating heat that is transferred to the reaction zone.

5. The heated fluidized bed reactor of claim 1, wherein the electrical current in the inert liner is supplied by a voltage means directly connected to the inert liner.

6. The heated fluidized bed reactor of claim 4, wherein the electrical current is supplied to said silicon coating by a voltage means directly connected to the inert liner.

7. The heated fluidized bed reactor of claim 6, wherein the inert liner is a graphite liner.

8. The heated fluidized bed reactor of claim 7, wherein the inert liner is capable of forming a silicon coating thereon, said coating being electrically conductive and also passing current received from the graphite liner, thereby generating heat that is transferred to the reaction zone.

9. The heated fluidized bed reactor of claim 1, wherein said inert liner is capable of forming a silicon carbide coating thereon.

10. A method of heating a fluidized bed reactio zone comprising:
    (a) surrounding the fluidized bed reaction zone with a liner which is in contact with the contents of the reaction zone and inert such that it at least does not adversely affect the reaction, said inert liner comprising an electrically conductive material that rises in temperature as an electric current is passed therethrough;
    (b) supplying an electrical current to the inert liner thereby causing the inert liner to generate heat that is transferred to the reaction zone.

11. The method of claim 10, wherein the inert liner has a top portion and a bottom portion and is thicker at its top portion than at its bottom portion.

12. The method of claim 11, wherein the amount of heat generated by the inert liner is greater at the bottom portion of the liner than the amount of heat generated at the top portion of the liner.

13. The method of claim 11, wherein the electrical current in the inert liner is supplied by applying a voltage directly to the inert liner.

14. The method of claim 12, wherein the temperature at the top of the inert liner when a current is passed therethrough ranges from about 500° C. to about 1400° C. and the temperature at the bottom of the reactor ranges from about 500° C. to about 1400° C.

15. The method of claim 14, wherein the electrical current ranges from about 7000 to about 15,000 amps.

16. A method for the production of high purity polycrystalline silicon by pyrolyzing silane containing gas in a fluidied bed reaction zone, comprising:
   (a) introducing silane containing gas in a fluidized bed of silicon seed particles for heterogeneously decomposing said silane containing gas, the fluidized bed of silicon particles being surrounded by a liner which is in contact with the contents of the reaction zone and being inert such that it at least does not adversely effect the reaction and comprising an electrically conductive material that rises in temperature as an electrical current is passed therethrough; and
   (b) supplying an electrical current to the inert liner thereby causing the inert liner to generate heat that is transferred to the reaction zone.

17. The method of claim 16, wherein the inert liner has a top portion and a bottom portion and is thicker at its top portion than at its bottom portion.

18. The method of claim 17, wherein the amount of heat generated by the inert liner is greater at the bottom portion of the liner than the amount of heat generated at the top portion of the liner.

19. The method of claim 17, wherein the electrical current in the inert liner is supplied by applying a voltage directly to the inert liner.

20. The method of claim 17, wherein the inert liner is a graphite liner.

21. The method of claim 19, wherein the temperature at the top of the inert liner when an electrical current is passed therethrough ranges from about 550° C. to about 1000° C. and the temperature at the bottom of the inert liner ranges from about 550° C. to about 1000° C.

22. The method of claim 21, wherein the electrical current ranges from about 7000 to about 15,000.

23. The method of claim 10 wherein the reaction zone comprises silicon particles useful in the pyrolysis of silane containing gas to silicon.

* * * * *

UNITED STATES PATENT AND TRADEMARK OFFICE
CERTIFICATE OF CORRECTION

PATENT NO. : 4,906,441
DATED : March 6, 1990
INVENTOR(S) : Robert N. Flagella

It is certified that error appears in the above-identified patent and that said Letters Patent is hereby corrected as shown below:

Column 1, line 27, "silicone" should read --silicon--.

Column 2, line 6, "production" should read --product--.

Column 4, line 14, "with" should read --within--.

Column 6, line 40, "linear" should read --liner--.

Column 7, line 40, "electrical" should read --electric--.

Column 8, line 8, "to be" should read --be--.

Column 9, line 24, "reacto4" should read --reactor--.

Column 10, line 7, "electrical" should read --electric--.

Column 10, line 45, "and" should read --and in--.

Column 11, line 42, "byy" should read --by--.

Claim 3, line 3 (Column 12, line 13), "byy" should read --by--.

UNITED STATES PATENT AND TRADEMARK OFFICE
CERTIFICATE OF CORRECTION

PATENT NO. : 4,906,441
DATED : March 6, 1990
INVENTOR(S) : Robert N. Flagella

It is certified that error appears in the above-identified patent and that said Letters Patent is hereby corrected as shown below:

Claim 10, line 1 (Column 12, line 42), "reactio" should read --reaction--.

Signed and Sealed this

Fourth Day of February, 1992

Attest:

HARRY F. MANBECK, JR.

*Attesting Officer*  *Commissioner of Patents and Trademarks*